US012411619B2

(12) United States Patent
Dong

(10) Patent No.: US 12,411,619 B2
(45) Date of Patent: Sep. 9, 2025

(54) MEMORY CHIP TEST PAD ACCESS MANAGEMENT TO FACILITATE DATA SECURITY

(71) Applicant: Micron Technology, Inc., Boise, ID (US)

(72) Inventor: Qi Dong, Shanghai (CN)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/946,738

(22) Filed: Sep. 16, 2022

(65) Prior Publication Data
US 2024/0069753 A1 Feb. 29, 2024

Related U.S. Application Data

(63) Continuation of application No. PCT/CN2022/114753, filed on Aug. 25, 2022.

(51) Int. Cl.
G06F 3/06 (2006.01)
G06F 21/57 (2013.01)
G06F 21/60 (2013.01)

(52) U.S. Cl.
CPC .......... G06F 3/0622 (2013.01); G06F 3/0629 (2013.01); G06F 3/0679 (2013.01); G06F 21/572 (2013.01); G06F 21/604 (2013.01)

(58) Field of Classification Search
CPC .... G06F 3/0679; G06F 3/0622; G06F 3/0659; G06F 21/79; G06F 21/572; G06F 21/604; G06F 2212/1052; G06F 11/2733; G06F 11/2273; G06F 12/0246; G06F 12/14; G06F 12/1458; G06F 12/1483; G06F 12/1491
See application file for complete search history.

(56) References Cited

U.S. PATENT DOCUMENTS

2009/0152544 A1 6/2009 Frenklakh
2017/0109527 A1 4/2017 Kim et al.
2020/0014544 A1* 1/2020 Sela ................. G06F 21/79
(Continued)

FOREIGN PATENT DOCUMENTS

JP 2001043140 A 2/2001

OTHER PUBLICATIONS

International Search Report and Written Opinion, PCT/CN2022/114753, Apr. 28, 2023.

Primary Examiner — Curtis James Kortman
(74) Attorney, Agent, or Firm — Greenberg Traurig

(57) ABSTRACT

A system for providing memory chip test pad access management to facilitate data security is disclosed. A host issues a command to access a non-volatile memory of a memory chip system via a test pad. A controller acknowledges the command by transmitting a response to the host to authenticate the host for access. The host then issues an authenticated command to modify a reserved byte of a protected memory partition of the non-volatile memory. The controller responds to the authenticated command and the reserved byte is modified. Firmware of the memory chip system monitors the modification of the reserved byte and notifies the memory chip system to activate a switch in an access control unit controlling access to the non-volatile memory. The switch is then activated, thereby closing a circuit to connect the test pad with the non-volatile memory. The host then access the non-volatile memory via the test pad.

20 Claims, 6 Drawing Sheets

(56) References Cited

U.S. PATENT DOCUMENTS

| 2020/0411129 | A1  | 12/2020 | Vigilante et al. |           |
|--------------|-----|---------|------------------|-----------|
| 2021/0286904 | A1* | 9/2021  | Cariello         | G06F 21/79 |
| 2022/0091760 | A1* | 3/2022  | Lee              | G06F 3/064 |

* cited by examiner

MEMORY CHIP TEST PAD ACCESS MANAGEMENT TO FACILITATE DATA SECURITY

RELATED APPLICATIONS

The present application is a continuation application of Int. Pat. App. No. PCT/CN2022/114753, filed Aug. 25, 2022, the entire disclosure of which application is hereby incorporated herein by reference.

FIELD OF THE TECHNOLOGY

At least some embodiments disclosed herein relate to memory devices in general, and more particularly, but not limited to, a system for providing memory chip test pad access management to facilitate data security.

BACKGROUND

Typically, a computing device or system includes one or more processors and one or more memory devices, such as memory chips or integrated circuits. The memory devices may be utilized to store data that may be accessed, modified, deleted, or replaced. The memory devices may be, for example, non-volatile memory devices that retain data irrespective of whether the memory devices are powered on or off. Such non-volatile memories may include, but are not limited to, read-only memories, solid state drives, and NAND flash memories. Additionally, the memory devices may be volatile memory devices, such as, but not limited to, dynamic or static random-access memories, which retain stored data while powered on, but are susceptible to data loss when powered off. Based on receipt of an input, the one or more processors of the computing device or system may request that a memory device of the computing system retrieve stored data associated with or corresponding to the input. In certain scenarios, the data retrieved from the memory device may include instructions, which may be executed by the one or more processors to perform various operations and may include data that may be utilized as inputs for the various operations. In instances where the one or more processors perform operations based on instructions from the memory device, data resulting from the performance of the operations may be subsequently stored into the memory device for future retrieval.

Test pads, which typically reside on a non-volatile memory chip package, may be utilized to test the operative functionality of the non-volatile memory of the non-volatile memory chip package. For example, test pads may be utilized by a manufacturer of non-volatile memory to test the non-volatile memory to cure defects, modify componentry, and perform modifications to the operative functionality o the non-volatile memory prior to distribution to third parties. While test pads facilitate troubleshooting of memory devices, the use of test pads can result in significant data security issues. Since test pads are typically directly connected to memory pads, hackers can potentially clone user data, tamper with critical system files, or implant backdoor programs to conduct remote system attacks. As a result, functionality associated with accessing non-volatile memories via test pads may be enhanced to provide greater security.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
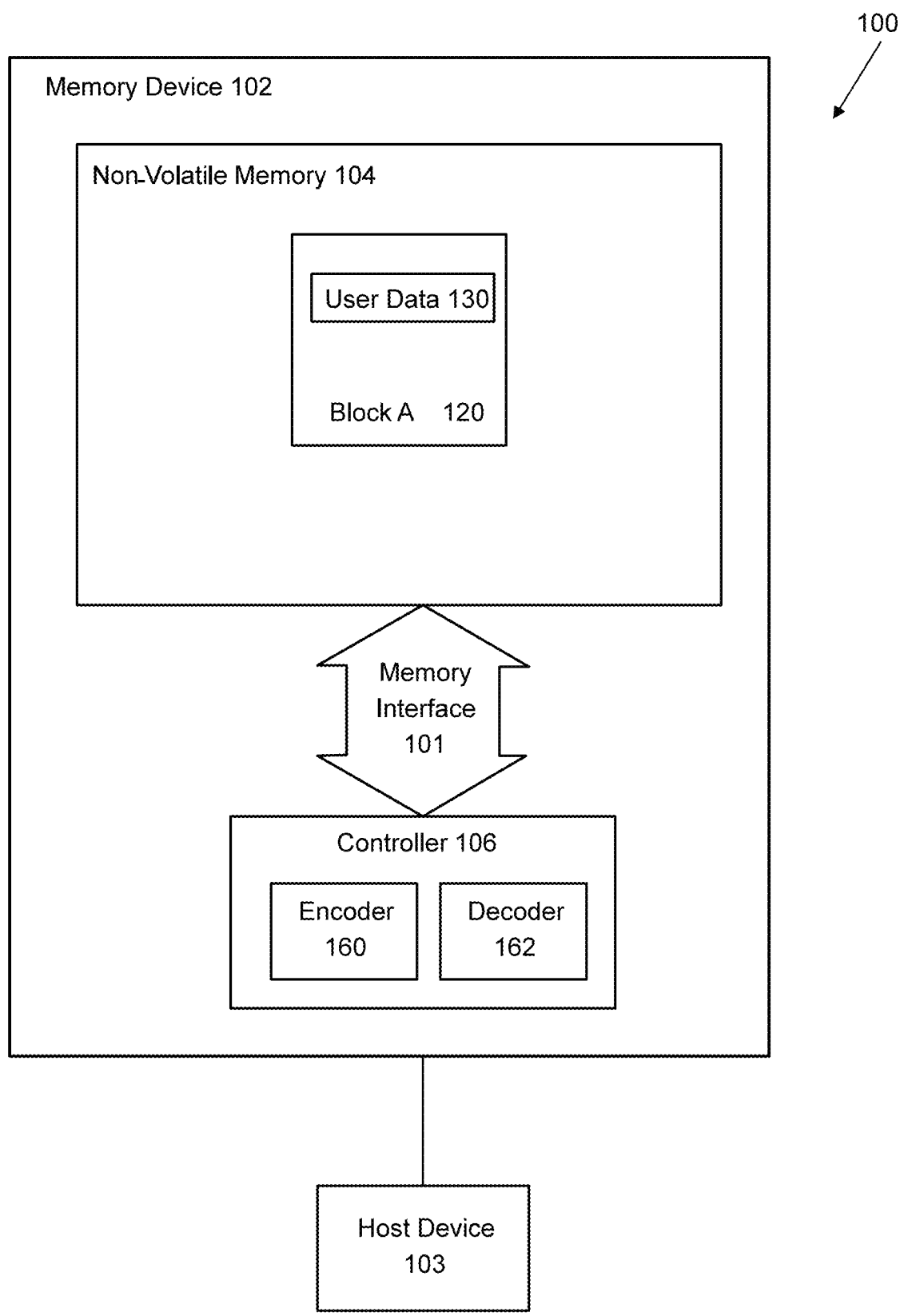
FIG. 1 shows a memory device and host device for supporting memory chip test pad access management in accordance with embodiments of the present disclosure.

The following disclosure describes various embodiments for memory chip test pad access management to facilitate data security of memory devices. At least some embodiments of the present disclosure relate to non-volatile memories, such as flash memory devices, and securing access to non-volatile memories, such as via test pads. Test pads are devices or components that may be utilized to effectively test and monitor the operative functionality and features of a memory chip. For example, test pads may be components that may reside on a non-volatile memory chip package that may be separated from defined pins of the memory chip (e.g., JEDEC-defined pins). In certain embodiments, tests pads may serve as an accessible channel through which a host (e.g., a processor on the same chip, a processor on a separate chip, a separate device, etc.) may monitor and access non-volatile memory of the memory chip connected to the test pads. When a host has access to the test pads and the test pads are connected to the non-volatile memory, the host may issue commands to write data, read data, modify data, access data, or perform a variety of other operations with respect to the non-volatile memory. Additionally, the host may receive test data resulting from testing of the non-volatile memory conducted by the test pads. The test data may be analyzed and utilized by a host to determine whether the non-volatile memory is operating in a manner as required or expected. In certain embodiments, the host may utilize the test data to facilitate determination as to whether the non-volatile memory is to be provided to a customer, discarded, or modified.

Nevertheless, since test pads typically reside on the non-volatile memory chip package and are directly connected to the non-volatile memory (e.g., NAND pads, eMMC, UFS, memory cards, BGA package SSD, etc.) of the memory chip package, malicious actors may utilize the test pads to clone user data stored on the non-volatile memory. In certain scenarios, such malicious actors may utilize the test pads as a communication channel to tamper or destroy critical system files stored on the non-volatile memory of the memory chip package. In other scenarios, malicious actors may even utilize test pad access to implant backdoor programs into the non-volatile memory to later conduct a remote system attack on a device incorporating the non-volatile memory. Such attacks are often fatal to the device under attack and are not allowed for applications incorporating non-volatile memory. For example, critical components of autonomous vehicles (e.g., advanced drive-assistance systems, dashboards, black boxes, etc.), banking and finance equipment (e.g., point-of-sale terminals, automated teller machines, etc.), and consumer devices (e.g., cellular phones, tablets, gaming devices, etc.) can be commandeered by malicious actors that may have access to test pads having unfettered access to non-volatile memories of memory chips.

According to embodiments of the present disclosure, systems, apparatuses, and methods are disclosed herein that intercept and control a host's access to non-volatile memory (e.g., NAND dice) via test pads of non-volatile memory systems (e.g., chips). In certain embodiments, the systems, apparatuses, and methods may incorporate the use of a unique access control unit that incorporates internal logic that serves as a bridge for signals of non-volatile memories to test pads of non-volatile memory systems and vice versa. For example, the non-volatile memory systems may include an access control unit that incorporates a switch to switch on or off the connection(s) between tests pads and the non-volatile memories connected to the test pads. In certain embodiments, the validity of a command issued by a host may be utilized to switch the connection on or off. In certain embodiments, the systems, apparatuses, and methods may also incorporate the use of secure protocols to facilitate authentication of a host with the non-volatile memories. For example, in certain embodiments, replay protected communication protocols may be utilized with the systems, apparatuses, and methods to provide protection against malicious data tampering that may be attempted by malicious actors. The replay protected memory mechanism may be utilized to prevent illegal attacks through vendor commands issued by host devices and componentry. For example, Replay Protected Memory Blocks may be an exemplary replay protocol that may be utilized to support the functionality of the systems, apparatuses, and methods disclosed herein. In certain embodiments, a reserved byte in a replay-protected partition of the non-volatile memory may be utilized to serve as an indicator of test pad access control.

Operatively, in certain embodiments, the systems, apparatuses, and methods may support test pad access management in the following exemplary manner. Initially, a host (e.g., system on a chip, processor of the chip, or other host) may issue a dedicated vendor command to a non-volatile memory chip through defined pins (e.g., JEDEC defined pins) according to a replay-protected required communication protocol (e.g., RPMB). For example, in certain embodiments, the host may issue a CMD56 command including an argument. The non-volatile memory system may acknowledge the command (e.g., the CMD56 command) with a response code that may be transmitted back to the host by the non-volatile memory system. In certain embodiments, once the host receives the correct response from the non-volatile memory system, the host may issue an authenticated command (e.g., CMD25, which may be a data write command) with the correct message authentication code (MAC) key and address of a protected memory partition (e.g., RPMB partition) as the argument of the command to change the reserved byte from zero to one (e.g., 0x0 to 0x1). In certain embodiments, the non-volatile memory system may receive the authenticated command and transmit a reply to the host including the correct response to the command. The non-volatile memory system may cause the reserved by type be changed from 0x0 to 0x1, for example.

Firmware of the non-volatile memory system may be configured to monitor the protected memory partition. For example, the firmware may be configured to monitor changes to the reserved byte of the protected memory partition. Upon detection of the value change of the reserved byte, the firmware may be configured to transmit a notification to the non-volatile memory system (e.g., such as to a controller of the non-volatile memory system or directly signal the access control unit) to activate one or more switches in the access control unit. The activation of the switch may cause the switch to close a circuit connecting the test pad(s) to the non-volatile memory. In certain embodiments, the default state of the access control unit is that the test pad(s) are disconnected from the non-volatile memory (e.g., NAND pads) after powering up the non-volatile memory system or device containing the non-volatile memory system. Once the switch(es) of the access control unit is/are closed and the circuit is closed, the host may be configured to access the non-volatile memory via the test pad(s). In certain embodiments, for example, the host may be able to perform various types of signal operations including, but not limited to, issuing commands for writing data to the non-volatile memory, reading data from the non-volatile memory, modifying data in the non-volatile memory, accessing data from the non-volatile memory, or a combination thereof. Additionally, in certain embodiments, the host may be configured to monitor a bus for the non-volatile memory and may be configured to monitor and obtain testing data resulting from testing conducted via the test pads. Such testing data may be analyzed to determine whether the non-volatile memory is operating in an expected manner, whether the non-volatile memory contains any failures, and whether the non-volatile memory need to be repaired, updated, or both.

In certain embodiments, through a similar process flow as described above, the host may also be configured to disconnect the test pads (i.e., cause the switch to open the closed circuit) from the non-volatile memory of the non-volatile memory system after toggling the reserved byte in the protected memory partition back to the original value (e.g., toggling the reserved byte back to 0x0 from 0x1). For example, the host may issue a command with an argument associated with disconnecting access to the non-volatile memory of the non-volatile memory system (e.g., system on a chip, etc.). The non-volatile memory system may acknowledge the command by transmitting a response (e.g., response code) back to the host. Once the host receives the correct response from the non-volatile memory system, the host may be configured to issue an authenticated command (e.g., CMD 25) with the correct MAC key and address of the protected memory partition as the argument to change the reserved byte back to 0x0 from 0x1, for example. The non-volatile memory system may receive the authenticated command and may reply with a correct response back to the host. The non-volatile memory system may the modify the reserved byte and the firmware of the non-volatile memory system may detect the value change for the reserved byte. The firmware may be configured to notify the non-volatile memory chip to turn off the switches in the access control unit. The non-volatile memory system may then cause the switches of the access control unit to be turned off, thereby causing the circuit connecting the test pad(s) with the non-volatile memory to be opened. Once the circuit is opened, the test pad(s) may be disconnected from the non-volatile memory, thereby preventing the host from accessing the non-volatile memory until the reserved byte is modified back to 0x1, for example. The processes described above may be repeated as necessary to provide or revoke access to the non-volatile memory of the non-volatile memory system via the test pad(s). Based on at least the foregoing, the functionality provided by the embodiments of the present disclosure provide significant enhancement test pad access technologies, while also ensuring increased data security and access control capabilities.

Referring now also to FIG. 1, FIG. 1 illustrates an exemplary architecture for a memory device 102 and host device 103 that may be utilized to support memory chip test pad access management in accordance with embodiments of the present disclosure. The memory device 102 and other componentry illustrated in the Figures may belong to a system 100. In certain embodiments, the memory device 102 is, for example, an SSD, eMMC, UFS, memory card, BGA package SSD, or other storage device, or a NAND-based flash memory chip or module that is capable of encoding and decoding stored data, such as by utilizing an encoder 160 and decoder 162 of the memory device 102. In certain embodiments, the memory device 102 may include any amount of componentry to facilitate the operation of the memory device 102. In certain embodiments, for example, the memory device 102 may include, but is not limited to including, a non-volatile memory 104, which may include any number of memory blocks, such as memory block 120 (e.g., Block A), a memory interface 101, a controller 106 (which may include an encoder 160 and/or a decoder 162), any other componentry, or a combination thereof. The memory device 102 may communicatively link with a host device 103, which may be or include a computer, server, processor, autonomous vehicle, any other computing device or system, or a combination thereof.

In certain embodiments, the controller 106 of the memory device 102 may be configured to control access to the non-volatile memory 104. In certain embodiments, user data 130 is provided by controller 106 to non-volatile memory 104, such as by utilizing memory interface 101. For example, the user data may be obtained from the host device 103 to be stored in the non-volatile memory 104, such as in memory block 120. In certain embodiments, the controller 106 may include an encoder 160 for generating ECC data (e.g., such as when writing data to the non-volatile memory 104), and decoder 162 for decoding ECC data (e.g., when reading data, such as from the non-volatile memory 104).

As indicated above, the memory device 102 may be configured to receive data (e.g., user data) to be stored from host device 103 (e.g., over a serial communications interface, or a wireless communications interface). In certain embodiments, the user data 130 may be video data from a device of a user, sensor data from one or more sensors of an autonomous or other vehicle, text data, audio data, virtual reality data, augmented reality data, information, content, any type of data, or a combination thereof. In certain embodiments, memory device 102 stores the received data in memory cells (not explicitly shown) of non-volatile memory 104. In one example, the memory cells may be provided by one or more non-volatile memory chips. In one example, the memory chips may be NAND-based flash memory chips, however, any type of memory chips or combination of memory ships may also be utilized. In certain embodiments, the system 100, memory device 102, and host device 103 may be integrated or communicatively linked with the system 200 illustrated in FIGS. 2 and 3, which is discussed in further detail below.

Figure 2:
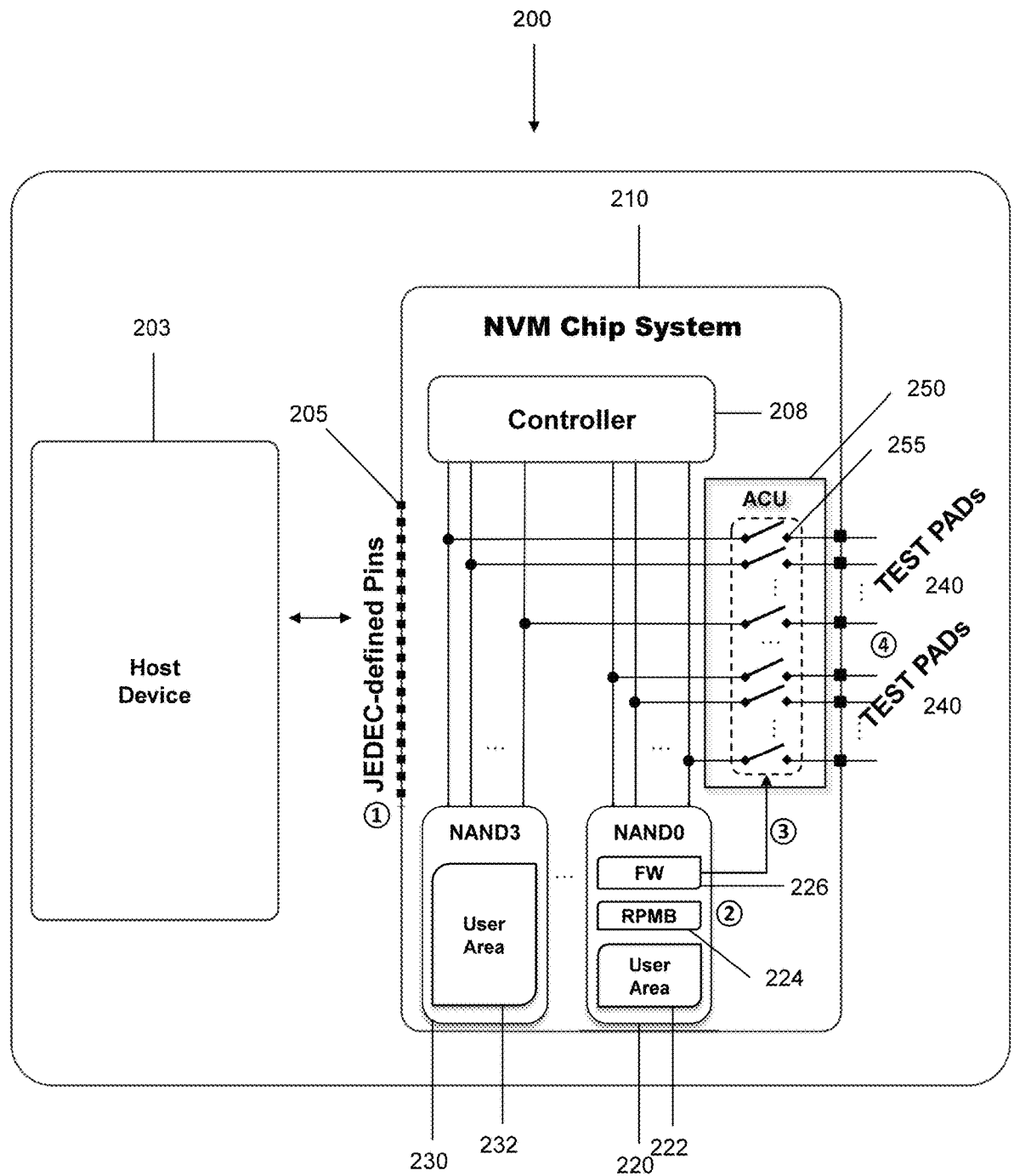
FIG. 2 shows a non-volatile memory chip system and host of a system-on-a-chip for supporting memory chip test pad access management featuring an access control unit disconnecting access to non-volatile memory via a test pad in accordance with embodiments of the present disclosure.
Figure 3:
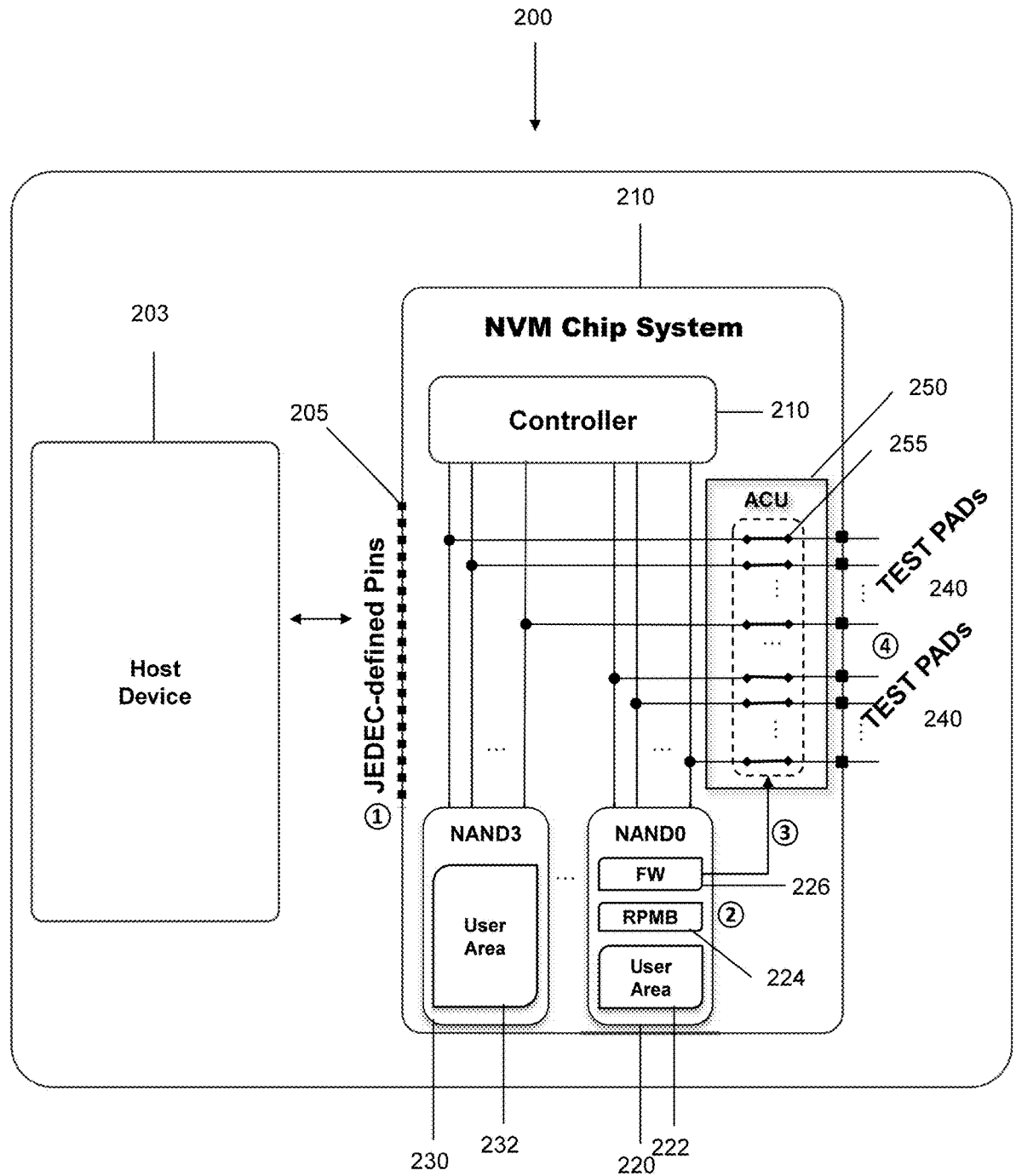
FIG. 3 shows a non-volatile memory chip system and host of a system-on-a-chip for supporting memory chip test pad access management featuring an access control unit connecting access to non-volatile memory via a test pad in accordance with embodiments of the present disclosure.

Referring now also to FIGS. 2 and 3, FIGS. 2 and 3 illustrate a non-volatile memory chip system 210 and host 203 of a chip system 200 (e.g. system-on-a-chip or other chip) for supporting memory chip test pad access management featuring an access control unit for controlling access to non-volatile memory of the non-volatile memory chip system 210 via test pads 240. In certain embodiments, the chip system 200 may be incorporated into any type of device including, but not limited to, a computer, a mobile device, a wearable device, an autonomous vehicle, a server, any type of device, or a combination thereof. In certain embodiments, the chip system 200 may include a host device 203, a non-volatile memory system 210, and any other componentry that may be included on a chip. In certain embodiments, the host device 203 may be a processor, computing device, or any type of componentry that may serve as a host for the chip system 200. In certain embodiments, the host device 203 may be attached to the chip system 200 and may be configure to communicate with a non-volatile memory system 210, which may also reside on the chip system 200. In certain embodiments, the host device 203 may interact with the non-volatile memory chip system 210, such as to generate commands to write data to non-volatile memory 220, 230 contained therein. Other interactions may include, but are not limited to, accessing data from the non-volatile memory 220, 230, reading data from the non-volatile memory 220, 230, erasing data from the non-volatile memory 220, 230, performing any other action with respect to the non-volatile memory 220, 230, or a combination thereof. In certain embodiments, the host device 203 may be configured to obtain testing data obtained from test pads 240 conducting tests that test the operative functionality of the non-volatile memory 220, 230. In certain embodiments, the host device 203 may issue commands to the non-volatile memory system 210 through defined pins (e.g., JEDEC-defined pins 205) of the non-volatile memory system 210. In certain embodiments, the commands that are issued through the defined pins 205 may follow replay-protected required communication protocols (e.g., RPMB protocols).

In certain embodiments, the non-volatile memory system 210 of the chip system 200 may include any number of components. In certain embodiments, the components of the non-volatile memory system 210 may include, but are not limited to, pins 205 (e.g., JEDEC-defined pins 205), a controller 208, a non-volatile memory 220, non-volatile memories 230, test pads 240, an access control unit 250, among other componentry. In certain embodiments, the pins 205 may be utilized by the host 203 to communicate with the non-volatile memory system 210. In certain embodiments, the controller 208 may be configured to control access to the other componentry of the non-volatile memory system 210. For example, the controller 208 may control access to the non-volatile memories 220, 230, the access control unit 250, the test pads 240, other componentry of the non-volatile memory system 210, or a combination thereof. In certain embodiments, the controller 208 may be configured to receive commands transmitted by or issued by the host device 203 that are intended for conducting operations with respect to the non-volatile memories 220, 230, access control unit 250, or test pads 240.

The non-volatile memory system 210 may include any number or type of memories including, but not limited to, non-volatile memories 220, 230. Illustratively, FIGS. 2 and 3 depict the use of four non-volatile memories: one non-volatile memory 220 (e.g., NAND0), and three non-volatile memories 230 (e.g. NAND1, NAND2, and NAND3). Notably, however, any number of non-volatile memories may be utilized with the non-volatile memory system 210. In certain embodiments, the non-volatile memories may be any type of memories including, but not limited to, NAND (e.g., NAND pads), SSD, UFS, memory cards, BGA package SSD, and other types of memories. Illustratively, FIGS. 2 and 3 depict the use of NAND memories. In certain embodiments, the non-volatile memory 220 may be configured to include a designated user area portion 222 (e.g., partition) dedicated to storing user data, a designated portion (e.g., partition) for including a replay protected memory block (RPMB) 224, and a designated portion (e.g., partition) for firmware 226. The user data stored in the user area 222 may include any type of data that may be stored in the non-volatile memory 220. Such data may include, but is not limited to, information, content, measurements, instructions, any type of data, or a combination thereof.

In certain embodiments, the replay protected memory block 224 may be configured to protect against replay attacks and may have any desired size. For example, the partition size for the replay protected memory block 224 may be multiples of 128 KB. In certain embodiments, the replay protected memory block 224 may utilized RPMB protocol to implement authentication and security for the non-volatile memory system 210, however, in certain embodiments, other security and authentication protocols may be utilized. In certain embodiments, at the manufacturing stage or at other desired times, an authentication key may be written into the replay protected memory block 224 and may be utilized as a shared secret to authenticate interactions and transactions conducted between the non-volatile memory system 210, the host 203, and other devices and componentry. In certain embodiments, commands, messages, transactions, or signals may be authenticated with the non-volatile memory system 210 by utilizing Message Authentication Code (MAC). In certain embodiments, MAC may comprise a hash value generated by utilizing the authentication key, a random number (e.g., provided by a host, such as host 203), and the message itself (or command, signal, etc.) using HMAC SHA-256, for example. In certain embodiments the MAC and key may be utilized to sign all operations, commands, signals, transactions, or messages intended to access the replay protected memory block 224. In certain embodiments, the replay protected memory block 224 may also include a reserved byte, which may be utilized to dedicatedly serve as an indicator of access control for the test pad 240. For example, if the reserved byte has a value of 0, this may mean that access to the non-volatile memories 220, 230 via test pads 240 should not be granted or enabled. If the reserved byte, on the other hand, has a value of 1, this may mean that access to the non-volatile memories 220, 230 via test pads 240 should be granted or enabled.

In certain embodiments, the firmware 226 may be configured to reside or be installed within the non-volatile memory 220. In certain embodiments, the firmware 226 may be configured to control the components of the non-volatile memory system 210. In certain embodiments, the functionality and features provided by the present disclosure may require the full initialization of the non-volatile memory system 210 with the firmware 226 running. In certain embodiments, the firmware 226 may also be configured to monitor the replay protected memory block 224 and the value of the reserved byte stored therein. In certain embodiments, the firmware 226 may reside within its own partition within the non-volatile memory 220. The firmware 226 may be configured to notify componentry of the non-volatile memory system 210 when a change the reserved byte value occurs. For example, in certain embodiments, the firmware 226 may be configured to notify the controller 208, the access control unit 250, or a combination thereof, when the reserved byte changes. Additionally, the firmware 226 may be configured to transmit a signal to the controller 208, the access control unit 250, or a combination thereof, to activate the switch 255 to close the circuit connecting the test pads 240 with the nonvolatile memories 220, 230 so that the host 203 may access the non-volatile memories 220, 230 via the test pads 240. Similarly, if the circuit is currently closed and the reserved byte in the replay protected memory block 224 is changed to 0, the firmware 226 may notify the controller 208, the access control unit 250, or both to turn off the switch 255 to open the circuit, thereby disconnecting the test pads 240 from the non-volatile memories 220, 230. The host 203 may then prevented from accessing the non-volatile memories 220, 230 via the test pads 240.

Figure 4:
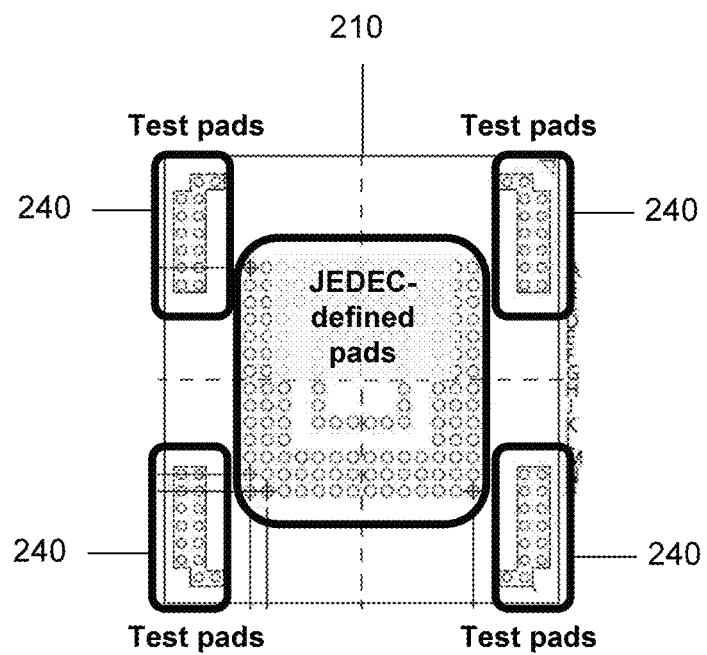
FIG. 4 illustrates test pads connected to non-volatile memory according to embodiments of the present disclosure.

In certain embodiments, the non-volatile memories 230 may be generally configured to include user areas 232. In certain embodiments, user area 232 may be a partition of the non-volatile memories 230 that may be configured to store user data. In certain embodiments, the host device 230 may be configured to access data, modify data, erase data, or perform other actions with respect to the data by interacting with the non-volatile memories 230 via the test pads 240. In certain embodiments, the non-volatile memory system 210 may include any number of test pads 240. The test pads 240 may be configured to test the functionality of the non-volatile memories 220, 230, such as during a manufacturing process or prior to distribution to customers. In certain embodiments, the test pads 240 may reside on the non-volatile memory system 210 and may be separated from defined pins (e.g., JEDEC-defined pins), as illustrated in FIG. 4. The test pads 240 may serve as an accessible channel to facilitate field issue analysis associated with the non-volatile memories 220, 230 as well. In certain embodiments, the test pads 240 may be configured to measure test data associated with the operation of the non-volatile memories 220, 230, which may then be utilized to determine whether the non-volatile memories 220, 230 are operating in an expected or desired manner, whether the non-volatile memories 220, 230 are fixable, whether the non-volatile memories 220, 230 are corrupted or malfunctioning, or a combination thereof. In certain embodiments, test data generated via the test pads 240 may be provided to the host device 203 for further analysis and processing.

In certain embodiments, the access control unit 250 of the non-volatile memory system 210 may be configured to control access to the switch 255 that may be utilized to open or close the circuit (e.g., by switching ON or OFF the connection) connecting the test pads 240 to the non-volatile memories 220, 230. In certain embodiments, the access control unit 250 may be an internal logic unit that serves as a bridge from the signals of the non-volatile memories 220, 230 (e.g., NAND dice) to the test pads 240 of the non-volatile memory system 210 and vice versa. In certain embodiments, the access control unit 250 may be configured to receive a signal from the firmware 226 or from the controller 208 to activate the switch 225 (i.e., turn ON) to close the circuit, as shown in FIG. 3. The signal may be received such as after detection by the firmware 226 that the value of the reserved byte of the replay protected memory block 224 has changed to 1 from 0. Similarly, when the reserved byte of the replay protected memory block 224 has changed to 0 from 1, a signal may be received, such as from the firmware 226 or controller 208 to deactivate the switch 225 (i.e., turn OFF) to open the circuit to disconnect the connection between the test pads 240 and the non-volatile memories 220, 230. In certain embodiments, the default state of the access control unit 250 upon initialization or power up of the non-volatile memory system 210 may be that the non-volatile memories 220, 230 are disconnected from the test pads 240 (i.e., the circuit is open), as shown in FIG. 2. In certain embodiments, the signal to switch on or off the connection between the test pads 240 and non-volatile memories 220, 230 may be provided only after validating and authenticating a command received from the host device 203.

Operatively, the system 100, the system 200, or a combination thereof, may operate as illustrated by the following exemplary use-case scenario. In the following example, a host (e.g., host device 203, which may be a system-on-a-chip) may be utilized to access non-volatile memories 220, 230 of a non-volatile memory system 210 via one or more test pads 240 contained therein. In a default state, the test pads 240 may be disconnected from the non-volatile memories 220, 230 upon power up, the circuit may be in an opened state, and the reserved byte of the replay protected memory block 224 may be set to 0x0. The host device 203 may issue a command (e.g., CMD56) with an argument, such as 0x110005DB to the non-volatile memory system 210, such as via defined pins 205. The non-volatile memory system 210 may acknowledge the command (e.g., CMD56) with a response code (e.g., 0x0D000009003F) back to the host device 203. After the host device 203 receives the correct response from the non-volatile memory system 210, the host device 203 may issue or transmit an authenticated command (e.g., a RPMB authenticated data write command (CMD25)) with the correct MAC key and address for the replay protected memory block 224 (e.g., RPMB address) as the argument to change the reserved byte of the replay protected memory block 224 from 0x0 to 0x1.

The non-volatile memory system 210 may receive the authenticated command and may reply with the correct response (e.g., 0x190000090031) to the host device 203, thereby authenticating and authorizing the host device 203 to communicate with the non-volatile memories 220, 230 via the test pads 240. If, however, the key is not correct or the address is incorrect, the host device 203 may be prevented from accessing the non-volatile memories 220, 230 via the test pads 240. If the key and address are correct, the reserved byte of the replay protected memory block 224 may be changed or toggled from 0x0 to 0x1. The firmware 226, which monitors the replay protected memory block 224, may detect the change in value for the reserved byte and may transmit a notification to the controller 208, the access control unit 250, or both to turn on the switch 255 (or switches) to close the circuit. The switch 255 may be turned on and the circuit may then be closed, thereby connecting the test pads 240 with the non-volatile memories 220, 230. Once the circuit is closed, the host device 203 may be configured to perform various signal operations with respect to the non-volatile memories 220, 230 via the test pads. Such signal operations may include, but are not limited to, issuing commands, monitoring NAND buses, writing data, erasing data, modifying data, accessing data, and the like. Through the same process flow, the host device 203 may be configured to also disconnect the test pads from the non-volatile memories 220, 230 by causing the reserved byte to be toggled back to 0x0 from 0x1. The processes of activation and deactivation may be repeated as necessary or as desired.

Figure 5:
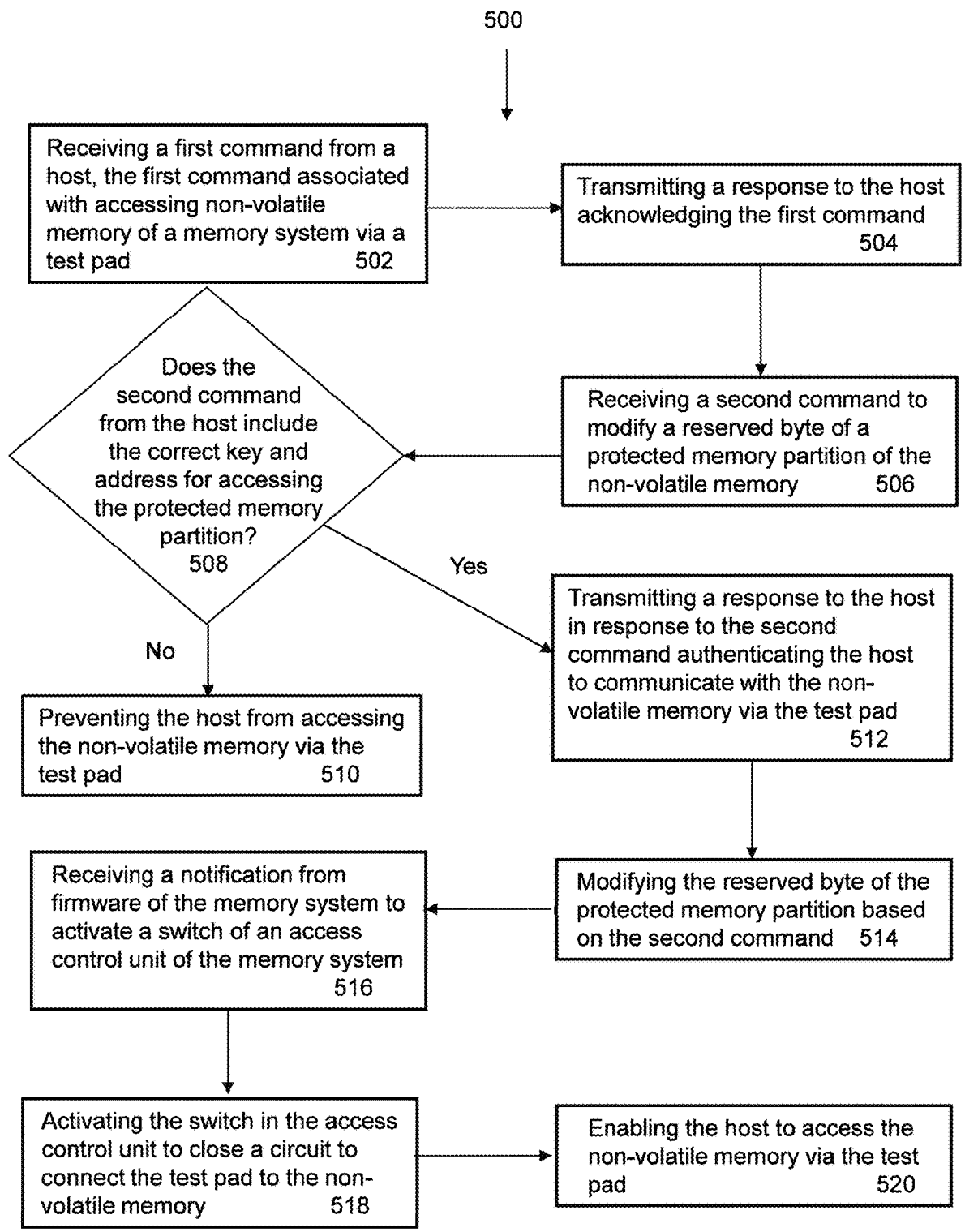
FIG. 5 illustrates a method for facilitating memory chip test pad access management to facilitate data security in accordance with embodiments of the present disclosure.

Referring now also to FIG. 5, FIG. 5 illustrates a method 500 for providing memory chip test pad access management to facilitate data security according to embodiments of the present disclosure. For example, the method of FIG. 5 can be implemented in the system of FIGS. 1-4, 6 and any of the other systems illustrated in the Figures. In certain embodiments, the method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 may be performed at least in part by one or more processing devices (e.g., controller 106 of FIG. 1, controller 208 of FIGS. 2 and 3, etc.). Although shown in a particular sequence or order, unless otherwise specified, the order of the processes may be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 500 may include steps for enabling and providing memory chip test pad access management for non-volatile memory devices including test pads that are utilized to test the operative functionality of the non-volatile memory. In certain embodiments, the method 500 may be performed by utilizing any combination of the systems 100, 200, 600, by utilizing any combination of the componentry contained therein, or a combination thereof. At step 502, the method 500 may include receiving a first command from a host (e.g., host 103, 203, etc.). In certain embodiments, the first command issued by the host may be a command associated with accessing non-volatile memory (e.g., non-volatile memory 220, 230) of a non-volatile memory system (e.g., non-volatile memory chip system 210 of system 200) via one or more test pads (e.g., test pads 240). In certain embodiments, the first command may be received by the non-volatile memory system, such as by a controller (e.g., controller 106 or controller 208) of the non-volatile memory system. For example, the first command may be a CMD56 command (e.g., memory health status command) including an argument.

At step 504, the method 500 may include transmitting a response acknowledging the first command. For example, in certain embodiments, in response to the CMD56 command, the non-volatile memory system may acknowledge the command with a response code that may be sent to the host. At step 506, the method 500 may include receiving a second command from the host to modify a reserved byte of a protected memory partition (e.g., RPMB 224) of the non-volatile memory (e.g., NAND memory pad 220). In certain embodiments, the second command may be a RPMB authenticated write command (e.g., CMD25) including a message authentication code (MAC) key and RPMB address (e.g., the address of RPMB 224) as the argument of the command to change the reserved byte from 0x0 to 0x1. In certain embodiments, when the reserved byte is 0, a circuit (e.g., circuit 255) may be disconnected, thereby disconnecting the connection between the test pads and the non-volatile memory. In certain embodiments, when the reserved byte is set to 1, the circuit may be closed, thereby connecting the test pad(s) with the non-volatile memory.

At step 508, the method 500 may include determining whether the second command from the host includes the correct key (e.g., MAC key) and address for the protected memory partition. If the correct key or address are not included with the second command, the method 500 may proceed to step 510. At step 510, the method 500 may include preventing the host from accessing the non-volatile memory of the non-volatile memory system via the test pad(s). If however, the second command from the host includes the correct key and the address for accessing the protected memory partition, the method 500 may proceed to step 512. At step 512, the method 500 may include transmitting a response to the host in response to the second command. In certain embodiments, the response may be utilized to authenticate the host providing the host's authority to communicate with the non-volatile memory via the test pad(s). For example, the non-volatile memory system may be configured to transmit the correct response to the host. At step 514, the method 500 may include modifying the reserved byte of the protected memory partition in response to or based on the second command. For example, the modification of the reserved byte may include changing the reserved byte from 0x0 to 0x1.

At step 516, the method 500 may include receiving a notification from firmware (e.g., firmware 226) of the non-volatile memory system to activate one or more switches (e.g., switch 255) of an access control unit (e.g., access control unit 250) of the non-volatile memory system. In certain embodiments, the firmware may actively monitor the protected memory partition, among other componentry of the non-volatile memory partition, and may be configured to detect any changes in values of the reserved byte of the non-volatile memory partition. Upon detection of the change in value of the reserved byte of the protected memory partition, the firmware may notify the controller of the non-volatile memory system or directly notify the access control unit to activate the switch(es) of the access control unit. At step 518, the method 500 may include activating the switch(es) in the access control unit to close a circuit connecting the non-volatile memory to the test pads. Once the circuit is closed, the method 500 may proceed to step 520. At step 520, the method 500 may include enabling the host to access the non-volatile memory via the test pad. For example, once the circuit is closed and the non-volatile memory is connected to the test pad via the closed circuit, the host may be enabled to perform various types of signal operations with respect to the non-volatile memory and test pads. In certain embodiments, the host may issue commands (e.g., write data to the non-volatile memory, access the non-volatile memory, modify data in the non-volatile memory, etc.), monitor a memory bus (e.g., NAND bus) of the non-volatile memory system, and perform other actions with respect to the non-volatile memory. In certain embodiments, the host may also be utilized to disconnect the test pads from the non-volatile memory by issuing commands to cause the reserved by to toggle from 0x1 to 0x0, which would then cause the switches to be turned off and cause the circuit to be opened. Notably, the method 500 may incorporate any of the other functionality as described herein and may be adapted to support the functionality of the systems 100, 200, and 600.

Figure 6:
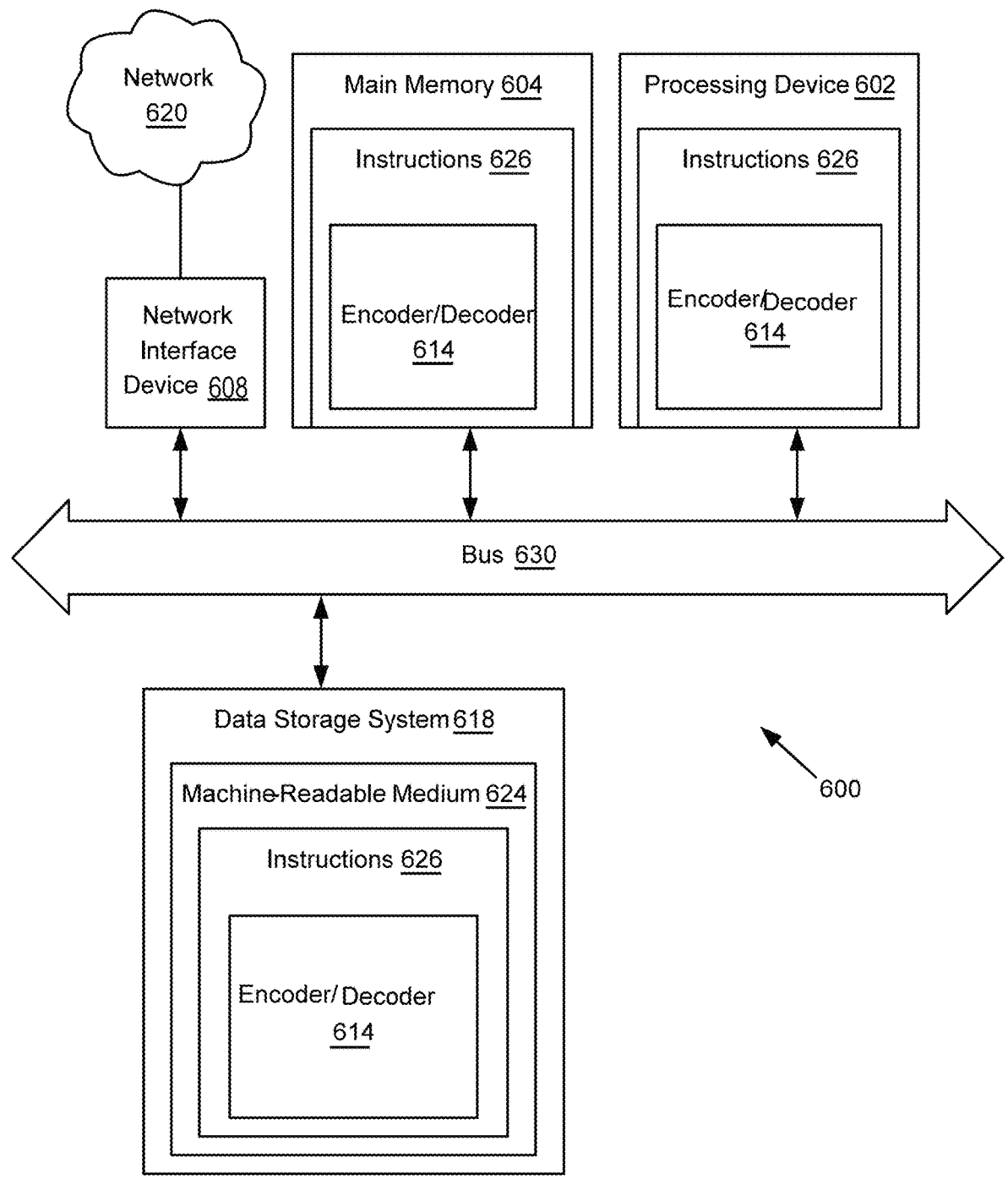
FIG. 6 illustrates a schematic diagram of a machine in the form of a computer system within which a set of instructions, when executed, may cause the machine to facilitate functionality supporting memory chip test pad access management according to embodiments of the present disclosure.

FIG. 6 illustrates an exemplary machine of a computer system 600 within which a set of instructions, for causing the machine to perform any one or more of the methodologies discussed herein, can be executed. In certain embodiments, the computer system 600 can correspond to a host system or device (e.g., the host device 203 of FIGS. 2 and 3) that includes, is coupled to, or utilizes a memory system (e.g., the non-volatile memory system 210 or chip system 200). In certain embodiments, computer system 600 corresponds to memory device 102, host device 103, or a combination thereof. In certain embodiments, the machine may be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment. In certain embodiments, the machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In certain embodiments, the exemplary computer system 600 may include a processing device 602, a main memory 604 (e.g., read-only memory (ROM), flash memory, dynamic random-access memory (DRAM) such as synchronous DRAM (SDRAM) or Rambus DRAM (RDRAM), static random-access memory (SRAM), etc.), and/or a data storage system 618, which are configured to communicate with each other via a bus 630 (which can include multiple buses). In certain embodiments, processing device 602 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets, or processors implementing a combination of instruction sets. In certain embodiments, the processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. For example, the processing device 602 may be configured to perform steps of the method 500 and support functionality provided by the systems 100 and 200. In certain embodiments, computer system 600 may further include a network interface device 608 to communicate over a network 620.

The data storage system 618 can include a machine-readable storage medium 624 (also referred to as a computer-readable medium herein) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory device 102, the non-volatile memory system 210, or a combination thereof.

Reference in this specification to "one embodiment" "an embodiment" or "certain embodiments" may mean that a particular feature, structure, or characteristic described in connection with the embodiment is included in at least one embodiment of the disclosure. The appearances of the phrases "in one embodiment" and "in certain embodiments" in various places in the specification are not necessarily all referring to the same embodiment(s), nor are separate or alternative embodiments mutually exclusive of other embodiments. Moreover, various features are described which may be exhibited by some embodiments and not by others. Similarly, various requirements are described which may be requirements for some embodiments, but not other embodiments.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
   a non-volatile memory configured to store data;
   an access control unit configured to control access to the non-volatile memory by a host via a test pad; and
   a controller, wherein the controller is configured to:
      receive a first command from the host, wherein the first command is associated with accessing the non-volatile memory via the test pad;
      transmit, to the host, a response code acknowledging the first command;
      modify, in response to a second command issued based on the response code being determined to be correct, a reserved byte of a protected memory;
      activate, in response to detection of modification of the reserved byte, a switch in the access control unit to close a circuit to connect the test pad to the non-volatile memory; and
      enable the host to access the non-volatile memory via the test pad after activation of the switch.

2. The system of claim 1, wherein the system further comprises firmware and the controller is further configured to activate the switch in the access control unit in response to a notification received from the firmware of the non-volatile memory.

3. The system of claim 2, wherein the firmware is configured to:
   monitor the reserved byte; and
   generate the notification upon detecting that the reserved byte of the protected memory partition of the non-volatile memory has been modified.

4. The system of claim 1, wherein the controller is further configured to:
   receive the second command to modify the reserved byte of the protected memory partition of the non-volatile memory, wherein the second command to modify the reserved byte of the protected memory partition comprises a replay protected memory block authenticated data write command, wherein the replay protected memory block authenticated data write command comprise a message authentication code key and a replay protected memory block address associated with the protected memory partition of the non-volatile memory.

5. The system of claim 1, wherein the controller is further configured to modify the reserved byte by changing a zero value of the reserved byte to a one value.

6. The system of claim 1, wherein the controller is further configured to receive a third command from the host, wherein the third command is associated with disconnecting access to the non-volatile memory via the test pad.

7. The system of claim 6, wherein the controller is further configured to transmit, to the host, a response acknowledging the third command.

8. The system of claim 7, wherein the controller is further configured to receive a fourth command from the host to modify the reserved byte of the protected memory partition.

9. The system of claim 8, wherein the controller is further configured to modify the reserved byte of the protected memory partition based on the fourth command.

10. The system of claim 9, wherein the controller is further configured to deactivate a switch in the access control unit to open a circuit to disconnect the test pad from the non-volatile memory.

11. The system of claim 10, wherein the controller is further configured to prevent the host from accessing the non-volatile memory via the test pad after deactivation of the switch.

12. The system of claim 1, wherein the controller is further configured to receive a signal from the host to monitor an operation conducted by the non-volatile memory via the test pad.

13. The system of claim 1, wherein the controller is configured to facilitate full initialization of the non-volatile memory and a firmware associated with the non-volatile memory.

14. A method, comprising:
   receiving, by a controller of a non-volatile memory system, a first command from a host, wherein the first command is associated with accessing non-volatile memory of the non-volatile memory system via a test pad;
   transmitting, by the controller of the non-volatile memory system and to the host, a response code acknowledging the first command;
   modifying, by the controller of the non-volatile memory system and in response to a second command issued based on the response code being determined to be correct, a reserved byte of a protected memory partition;
   activating, by the controller of the non-volatile memory system and in response to detection of modification of the reserved byte, a switch in an access control unit to close a circuit to connect the test pad to the non-volatile memory; and
   enabling, by the controller of the non-volatile memory system, the host to access the non-volatile memory via the test pad after activation of the switch.

15. The method of claim 14, further comprising authenticating the host with the non-volatile memory system based on the response acknowledging the first command.

16. The method of claim 14, further comprising enabling the host to write data to the non-volatile memory via the test pad, read data from the non-volatile memory via the test pad, change data in the non-volatile memory via the test pad, or a combination thereof.

17. The method of claim 14, further comprising enabling the host to obtain a test result associated with the test pad testing the non-volatile memory.

18. The method of claim 14, further comprising activating the switch in response to receiving a notification from a firmware of the non-volatile memory system.

19. The method of claim 14, further comprising opening the circuit in response to a third command received from the host.

20. A device, comprising:
a host;
a non-volatile memory configured to store data;
an access control unit configured to control access to the non-volatile memory by the host via a test pad; and
a controller, wherein the controller is configured to;
   receive a command from the host, wherein the command is associated with accessing the non-volatile memory via the test pad;
   transmit, to the host, a response code acknowledging the command, wherein the response code facilitates authentication of the host to communicate with the non-volatile memory;
   modify, in response to a second command issued based on the response code being determined to be correct, a reserved byte of a protected memory partition;
   activate, in response to detection of modification of the reserved byte, a switch in the access control unit to close a circuit to connect the test pad to the non-volatile memory; and
   enable the host to access the non-volatile memory via the test pad upon closing the circuit.

\* \* \* \* \*